United States Patent
Tjader

(10) Patent No.: US 7,125,001 B2
(45) Date of Patent: Oct. 24, 2006

(54) METHOD AND DEVICE FOR PULLING A CABLE THROUGH A SECTION OF PIPE

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

(21) Appl. No.: 10/942,411

(22) Filed: Sep. 16, 2004

(65) Prior Publication Data

US 2005/0040380 A1    Feb. 24, 2005

Related U.S. Application Data

(63) Continuation of application No. 10/341,549, filed on Jan. 13, 2003, now Pat. No. 6,830,234.

(60) Provisional application No. 60/359,954, filed on Feb. 27, 2002, provisional application No. 60/347,544, filed on Jan. 11, 2002.

(51) Int. Cl.
  *B66F 3/00*    (2006.01)

(52) U.S. Cl. ................. 254/134; 254/134.3 R

(58) Field of Classification Search ....... 254/134.3 FT, 254/134.3 R, 134.3 CL, 134.3 PA
See application file for complete search history.

(56) References Cited

U.S. PATENT DOCUMENTS

| | | | |
|---|---|---|---|
| 1,653,267 A | 12/1927 | Garber et al. | |
| 3,902,228 A | 9/1975 | Caradot | 24/134 N |
| 4,423,853 A | 1/1984 | Davis, Sr. | 254/390 |
| 4,690,381 A | 9/1987 | Asai | 254/394 |
| 5,423,517 A | 6/1995 | Rausch | 254/134.3 FT |
| RE35,542 E | 6/1997 | Fisk et al. | 405/156 |
| 5,941,507 A | 8/1999 | Page | 254/134.3 PA |
| 6,305,880 B1 | 10/2001 | Carter et al. | 405/184.3 |
| 6,315,269 B1 | 11/2001 | Fleury et al. | 254/134.3 PA |
| 6,524,031 B1 | 2/2003 | Carter et al. | 405/184.3 |
| 6,540,207 B1 | 4/2003 | Barnes | 254/134.3 R |
| 6,682,050 B1 | 1/2004 | Ray | 254/134 R |
| 2003/0075711 A1* | 4/2003 | Cook et al. | 254/134.3 FT |

OTHER PUBLICATIONS

"PCT Written Opinion", PCT/US03/00824, Mailing Date—Nov. 11, 2003, International filing date—Jan. 13, 2003, 7.

* cited by examiner

*Primary Examiner*—Lee D. Wilson
(74) *Attorney, Agent, or Firm*—Schwegman, Lundberg, Woessner & Kluth, P.A.

(57) ABSTRACT

An improved cable pulling device and method is shown. The cable pulling device is smaller, less expensive, and easy to use for lateral line replacement. The cable pulling device includes a cable contacting portion that provides supplemental frictional force during a rotational pulling stroke. Among other advantages, this allows a smaller, more compact design that provides higher gripping and pulling power. Embodiments as described above further allow for a smooth jaw configuration that reduces cable damage. A cable pulling device is also shown that includes a configuration of a force distributing device. One embodiment includes substantially orthogonal plates that help to reduce device twisting during a pulling operation. In a further embodiment, a force distributing device is adapted for attachment to a ground working implement arm.

22 Claims, 8 Drawing Sheets

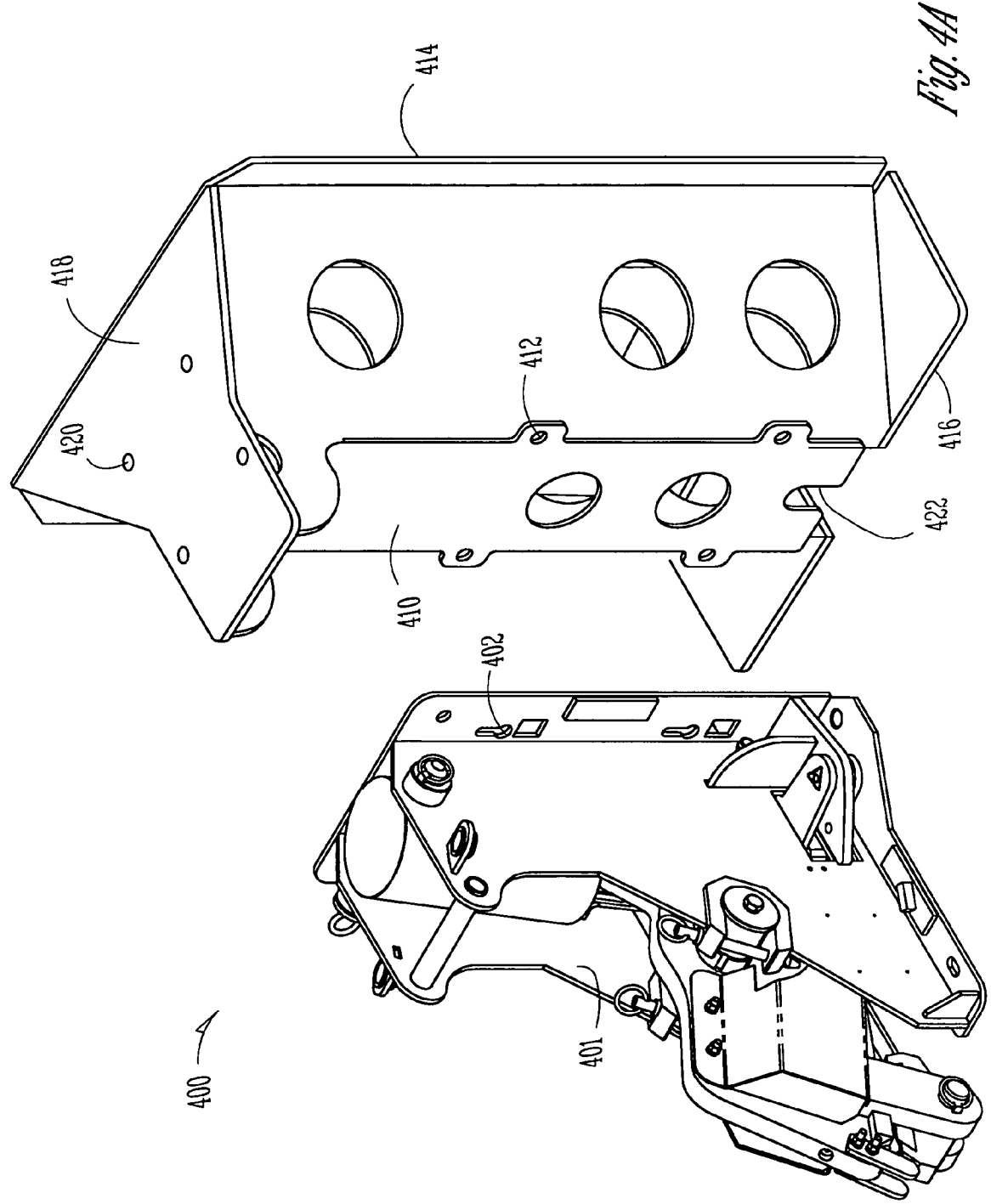

METHOD AND DEVICE FOR PULLING A CABLE THROUGH A SECTION OF PIPE

This application is a continuation of U.S. patent application Ser. No. 10/341,549, filed Jan. 13, 2003, now U.S. Pat. No. 6,830,234 which claims priority to U.S. Provisional Application No. 60/359,954, filed Feb. 27, 2002 and U.S. Provisional Application No. 60/347,544, filed Jan. 11, 2002, which are incorporated herein by reference.

TECHNICAL FIELD

The invention relates to pulling cables through sections of pipe. Specifically, the invention relates to pipe bursting and replacement or pipe lining.

BACKGROUND

Pipe such as cast iron, clay or ductile metal pipe has been used for connecting homes and creating networks for utilities such as water, sewer, or gas, etc. As the pipe becomes old, it may crack or break, necessitating replacement of the pipe.

A technique know as pipe bursting is currently used as a convenient method to replace underground pipe without the need to dig up the pipe to be replaced. A pipe breaking device, commonly called an expander or a mole, is pulled or pushed through the existing pipe while it is still underground. The expander is designed to break, or burst the pipe, and at the same time to expand the broken pieces of the pipe into the surrounding soil. The expansion of the broken pipe allows the expander to pull a replacement pipe into place. Alternatively, some methods use the expander to merely pull a smaller diameter pipe into place inside the existing pipe, however, this method restricts the flow in the replaced pipe due to the smaller diameter of the replacement or liner pipe. The pipe bursting, or lining technique has typically been employed on large diameter pipe such as water or sewer main lines. Due to the size of pipe in these types of replacements, the equipment used for pulling or pushing the expander through the pipe requires a great deal of force. As a result, common equipment in the industry for pulling or pushing the expander is relatively large and expensive such as an above ground winch and pulley system. These larger scale methods also commonly require a large access pit to be excavated on at least one end of the pipe to be replaced.

More recently, the technique of pipe bursting has been employed for smaller diameter pipe such as for lateral lines. Smaller branch pipes from a large water or sewer, etc. main line are commonly referred to as lateral lines. Replacement of smaller lateral lines is typically a lower cost job than main lines, and due to the lower profit possibilities, these jobs are frequently left to smaller contractors.

A problem arises for the smaller contractors who wish to use the pipe bursting technique for lateral line replacement. The common industry equipment for drawing or pushing the expanders through the pipe is too expensive to purchase or lease relative to the smaller profits from lateral line replacement.

What is needed is a cable pulling device that is smaller, less expensive, and easy to use to be practical for lateral line replacement.

SUMMARY

The above mentioned needs of smaller, less expensive and easier to use cable pullers are addressed by the present invention and will be understood by reading and studying the following specification.

A cable pulling device is shown. The cable pulling device includes a base unit, and a cable contacting portion. A pivot joint rotatably connects the cable contacting portion to the base unit. The cable pulling device also includes a first cable gripping device attached to the cable contacting portion, the first cable gripping device being adapted to selectively engage and release a cable. The cable pulling device also includes an actuating device adapted to cycle the cable contacting portion back and forth about the pivot joint.

Another embodiment of a cable pulling device is shown. The cable pulling device includes a base unit and a cable contacting portion. A pivot joint rotatably connects the cable contacting portion to the base unit. The cable pulling device also includes a first cable gripping device attached to the cable contacting portion, the first cable gripping device being adapted to selectively engage and release a cable. The cable pulling device also includes an actuating device adapted to cycle the cable contacting portion back and forth about the pivot joint. The cable pulling device also includes a connection surface attached to the cable pulling device, wherein the connection surface is adapted to couple to a ground working implement arm. Another embodiment of a cable pulling device is shown. The cable pulling device includes a base unit and an arcuate cable guide. The arcuate cable guide includes a cable guide groove and a friction engaging surface substantially within the cable guide groove. The cable pulling device also includes a pivot joint rotatably connecting the arcuate cable guide to the base unit and a first cable gripping device attached to the arcuate cable guide adjacent to the friction engaging surface. The cable pulling device also includes a first actuating cylinder attached to the first cable gripping device, wherein the first actuating cylinder is adapted to actuate a gripping force between the first cable gripping device and the friction engaging surface; and a second actuating cylinder adapted to cycle the arcuate cable guide back and forth about the pivot joint.

A method of pulling a cable through a section of pipe is also shown. The method includes placing a cable within a section of pipe, and placing a portion of the cable outside the section of pipe along a friction engaging surface of a cable contacting portion. The method further includes cycling the cable contacting portion through at least one cycle. A cycle includes actuating a first cable gripping device attached to the cable contacting portion, wherein a gripping force is applied to the cable in at least a portion of the friction engaging surface. The cycle also includes pivoting the cable contacting portion about a pivot joint from a first end of a range of motion to a second end of the range of motion to generate an axial pulling force in the cable. The cycle also includes releasing the first cable gripping device at the second end of the range of motion to release the gripping force on the cable, and returning the cable guide to the first end of the range of motion.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 4A shows a perspective view of a cable pulling device according to one embodiment of the invention.

DETAILED DESCRIPTION

Figure 1:
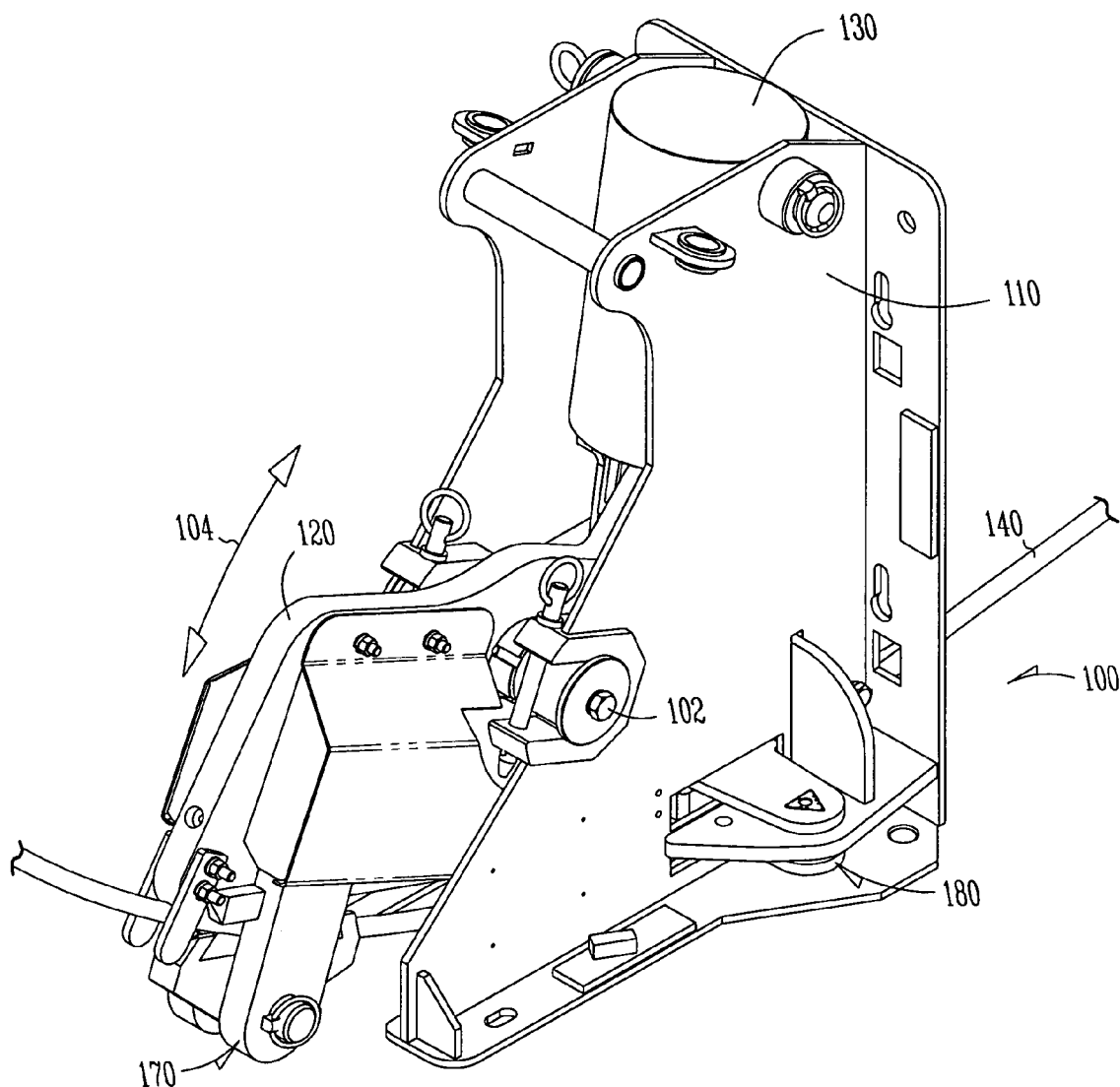
FIG. 1 shows a perspective view of a cable pulling device according to one embodiment of the invention.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or operational changes may be made without departing from the scope of the present invention.

In the following description, the term cable refers to any of a number of flexible products. The term cable includes wire rope, and cables or ropes made from a number of materials including steel. In the following description, unless otherwise provided, descriptions of forces, locations, etc. that involve a cable as described above will refer to radial and axial forces. Axial forces, such as tension in a cable refer to forces substantially along a longitudinal axis of a cable. Forces such as gripping forces generally refer to forces that resist a countering axial force. In one example, a gripping force includes a frictional force generated by an element such as a jaw, placed in contact with a cable. A frictional force is related to a radial force substantially normal to the longitudinal axis of a cable, the surface area of contact, and a coefficient of friction related to the material interface.

FIG. 1 shows a cable pulling device 100. The cable pulling device 100 includes a base unit 110 and a cable contacting portion 120. The cable contacting portion 120 is coupled to the base unit 110 at a pivot joint 102. The cable contacting portion 120 is rotatable in a range of motion 104 relative to the base unit 110 about the pivot joint 102. In one embodiment, a main actuator 130 is coupled between the base unit 110 and the cable contacting portion 120 to drive the cable contacting portion 120 in the range of motion 104. In one embodiment, a first cable gripping device 170 is coupled to the cable contacting portion 120. The first cable gripping device 170 is used to apply a gripping force to a cable 140. In one embodiment, the first cable gripping device 170 applies a gripping force by actuating at least one jaw against the cable contacting portion 120. Further embodiments of the first cable gripping device 170 are discussed in detail below.

In one embodiment, a second cable gripping device 180 is further included in the cable pulling device 100. In one embodiment, the second cable gripping device 180 is designed to selectively apply a cable gripping force. In one embodiment the second cable gripping device 180 provides a cable gripping force at least during periods of operation when the first cable gripping device 170 is disengaged from the cable 140. Further embodiments of the second cable gripping device 180 are also discussed in detail below.

Figure 2A:
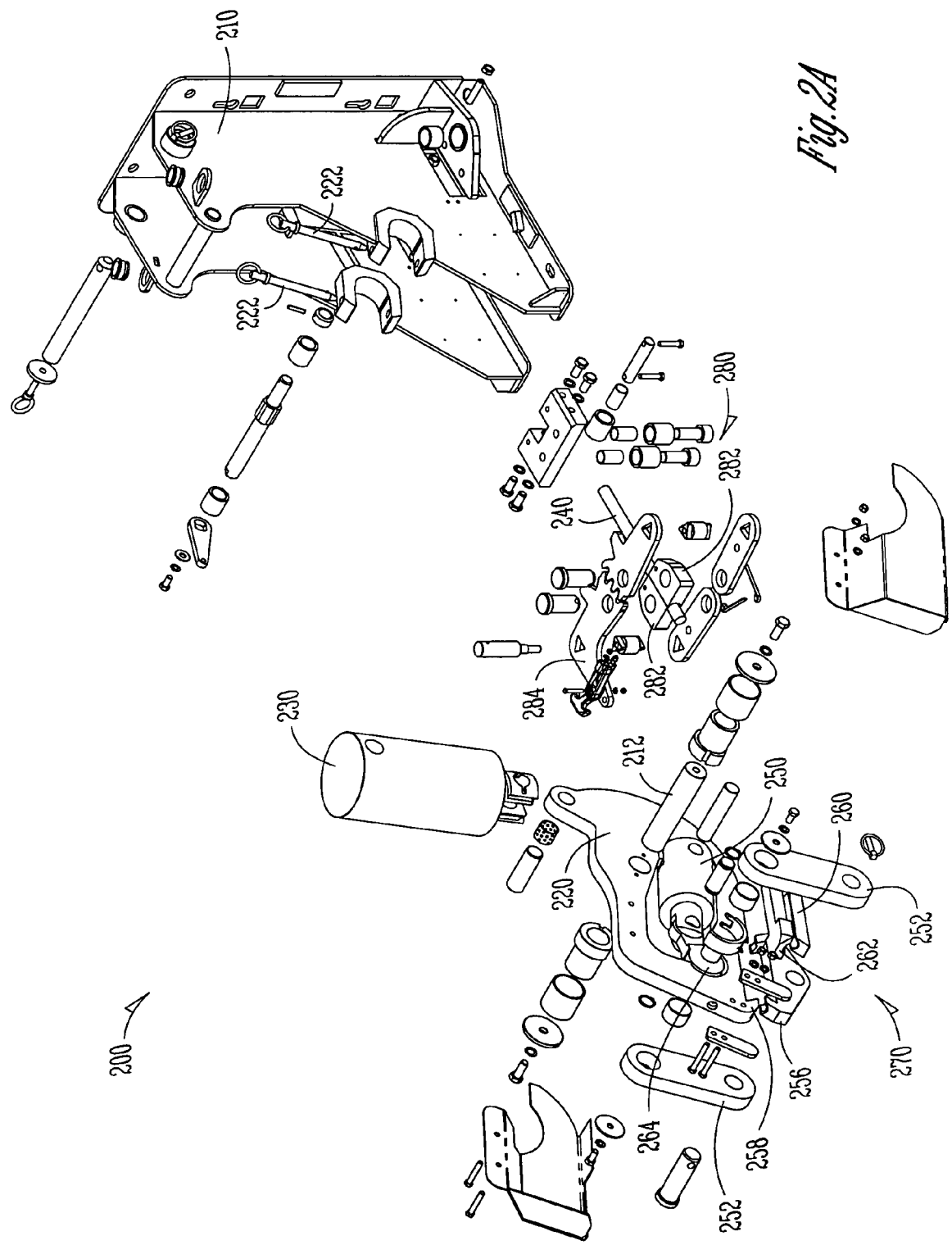
FIG. 2A shows an exploded view of a cable pulling device according to one embodiment of the invention.

FIG. 2A shows an embodiment of a cable pulling device 200. A base unit 210 is shown, with a cable contacting portion 220. The cable contacting portion 220 is coupled to the base unit 210 via a pivot joint 212. In one embodiment, the pivot joint 210 is removable using quick release pins 222.

A first cable gripping device 270 is also shown in FIG. 2A. In one embodiment, the first cable gripping device 270 includes a pair of side plates 252, a cam 264, a jaw carrier 256, a first jaw 260 and a second jaw 262, and a first cable gripping device actuator 250. The first jaw 260 is coupled to the jaw carrier 256, while the second jaw 262 is coupled to the cable contacting portion 120. The jaw carrier 256 is further coupled to the side plates 252, and the side plates 252 are coupled to the cam 264.

The cam 264 is rotatable through a range of motion that facilitates actuation of the first cable gripping device 270. The side plates 252 are coupled to the cam 264, such that when the cam 264 is rotated through the range of motion, the side plates 252 are forced towards the cable contacting portion 220 in a clamping motion. The cam 264 is actuated in its range of motion by the first cable gripping device actuator 250. In one embodiment, the actuator 250 is coupled between the cam 264 and the cable contacting portion 220.

Other methods for actuating the first cable gripping device 270 are contemplated within the scope of the invention. While a cam 264 and actuator 250 are shown in FIG. 2A, alternative mechanical linkages or force generating devices can be used. In one embodiment, the first cable gripping device 270 is selectively actuated by an actuator 250 as described above. Other embodiments include a first cable gripping device 270 that is passively actuated, such as by cable tension. In one embodiment, the first cable gripping device 270 includes, but is not limited to, a wedge, a camming device, a number of collets, etc.

In one embodiment, a second cable gripping device 280 is further included. FIG. 2A shows one embodiment of the second cable gripping device 280 including a pair of jaws 282. Embodiments with a single jaw, or multiple jaws are also contemplated within the scope of the invention. Further, aside from use of jaws, alternative mechanical linkages or force generating devices can be used. In one embodiment, the pair of jaws 282 are coupled to the base unit 210 using a pair of pivot joints. In one embodiment, the pair of jaws 282 are actuated to apply a cable gripping force in a passive manner. In one embodiment, the pair of jaws 282 are actuated in response to an axial cable tension using a camming or wedging action. Other embodiments include a second cable gripping device 280 that is selectively actuated by an actuation device.

In one embodiment, a jaw opening device 284 is further included and coupled to the pair of jaws 282. In operation, a user is optionally permitted to open the pair of jaws 282 using the jaw opening device 284 for reasons such as to insert a cable 240 into the second cable gripping device 280 in an initial setup for a cable pulling operation. Notably, the pair of jaws 282 in FIG. 2A are positioned such that when open, they permit the cable 240 to be inserted from above, or below without disassembly of the second cable gripping device 280. This configuration allows a user to quickly and efficiently insert a cable in an initial setup operation. In one embodiment, the jaw opening device 284 further serves a function as a jaw synchronizing device. Elements such as meshing teeth serve to move both of the pair of jaws 282 in a substantially symmetric manner.

In one embodiment, the cable pulling device includes a main actuator 230 that drives rotation of the cable contacting surface 220 about the pivot joint 212. As discussed above, in one embodiment, the first cable gripping device 270 also includes an actuator 250 that provides force for a gripping operation of the first cable gripping device 270. Although two separate actuators are shown in FIG. 2A, other embodiments include a single actuator that provides both main rotation force, and a gripping force. In one embodiment, the main actuator 230 and the actuator 250 include hydraulic cylinders. Other possible actuators include, but are not limited to, electric actuators, pneumatic actuators, etc. In one embodiment, the main actuator 230 and the actuator 250 of the first cable gripping device are coupled separately to an external source of hydraulic pressure. In one embodiment, the main actuator 230 and the actuator 250 of the first cable gripping device are coupled to a single external source of hydraulic pressure, and actuated in a desired sequence using a timing valve. Although the embodiment shown in FIG. 2A is adapted for an external hydraulic pressure source, other embodiments include local hydraulic pressure sources, or other sources of actuation power.

Figure 2B:
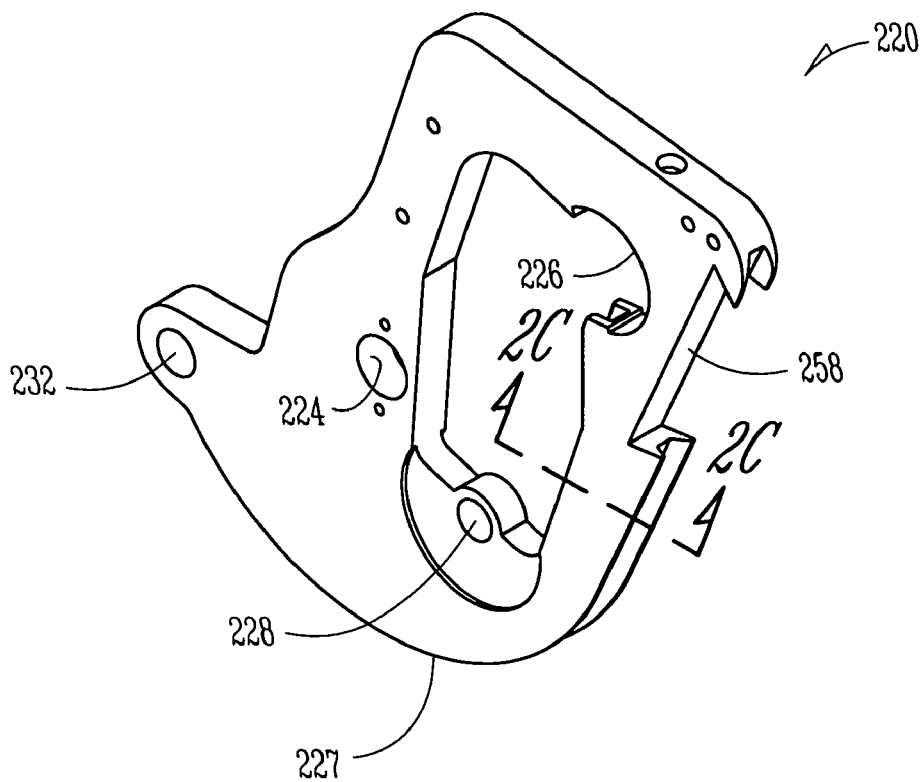
FIG. 2B shows a component of a cable pulling device according to one embodiment of the invention.
Figure 2C:
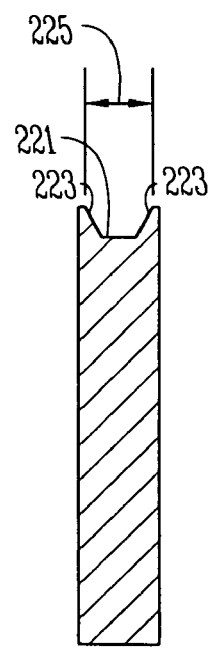
FIG. 2C shows a cross section from FIG. 2B.

FIGS. 2B and 2C further show the cable contacting portion 220. The cable contacting portion 220 shown in FIG. 2B includes a joint portion 224 that is used to rotatably join the cable contacting portion 220 with the base unit 210 as shown in FIG. 2A. FIG. 2B further shows an actuator mount 232 for coupling to the main actuator 230 as shown in FIG. 2A. In one embodiment, a cable gripping device actuator mount 228 is included, along with a cam engaging surface 226. The cable gripping device actuator mount 228 and cam engaging surface 226 are used in embodiments described above that incorporate a cam 264 and an actuator 250 with the first cable gripping device 270. In one embodiment, a jaw engaging region 258 is further included in the cable contacting portion 220 to accept at least one jaw.

In one embodiment, the cable contacting portion 220 includes a cable guide surface 221. In one embodiment, the cable guide surface includes an arcuate portion 227. The arcuate portion 227 may include an arc of a circle, a portion of an ellipse, or another curved segment such as an exponential, or logarithmic curve. A cable is both guided by the cable guide surface 221, and frictionally engaged by the cable guide surface 221. Frictional engagement is made possible due to the rotation of the cable contacting portion 220, in contrast to a linear pull arrangement. During rotation, an axial force of the cable also provides a normal force of the cable against the cable contacting portion 220. The specific shape of the cable contacting portion 220 (such as an arcuate shape) helps to determine the magnitude and rate of change of normal forces generated against the cable contacting portion 220. This normal force contributes to frictional engagement of the cable with the cable contacting portion 220. In a linear pull arrangement, no normal force is generated.

In one embodiment, the cable guide surface 221 includes a groove with a dimension 225 that is sized to be smaller than a cable that is to be pulled. In one embodiment, the groove includes at least one tapered wall 223 that further frictionally engages a cable to be pulled.

Figure 2D:
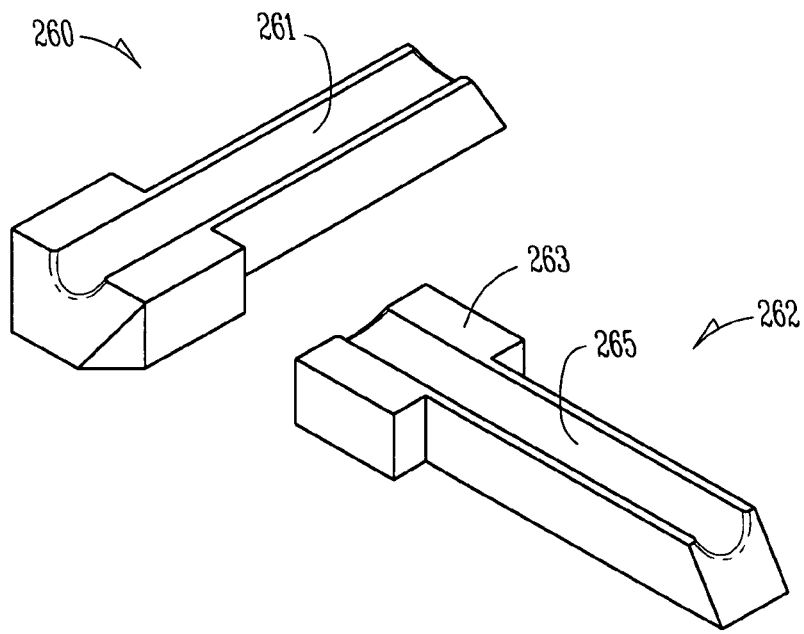
FIG. 2D shows jaw components of a cable pulling device according to one embodiment of the invention.

As discussed above in one embodiment, the first cable gripping device includes a number of jaws. FIG. 2D illustrates an example of jaws associated with one embodiment of the first cable gripping device 270. The first jaw 260 and the second jaw 262 are shown in FIG. 2D. In one embodiment, the jaws are fabricated separately from other components to facilitate replacement or repair of jaws. Other embodiments include jaws that are integrally formed into components of the cable pulling device 200. One embodiment of the second jaw 262 includes a protrusion 263 used to engage the pair of side plates 252 as shown in FIG. 2A. In one embodiment, the first jaw 260 and the second jaw 262 include a smooth cable contacting surface 261 and 265 respectively. Other embodiments include a textured cable contacting surface 261, such as ridges, or teeth. In one embodiment, only one of the jaws includes a smooth cable contacting surface. While a textured cable contacting surface 261 enhances a gripping force, a smooth cable contacting surface 261 is desirable because in minimizes damage to a surface of a cable.

A smooth cable contacting surface 261 of a jaw is practical in applications where a high enough gripping force is provided, without the need for a textured jaw surface. One advantage of utilizing a cable contacting portion 220 as described above with features that frictionally engage a cable is that the cable contacting portion 220 provides supplemental force to resist cable tension during a cable pulling operation. In some applications, a smooth cable contacting surface 261 of a jaw is only possible in designs were a supplemental force is provided, such as the force provided by embodiments of the cable contacting portion 220 as described above.

Figure 2E:
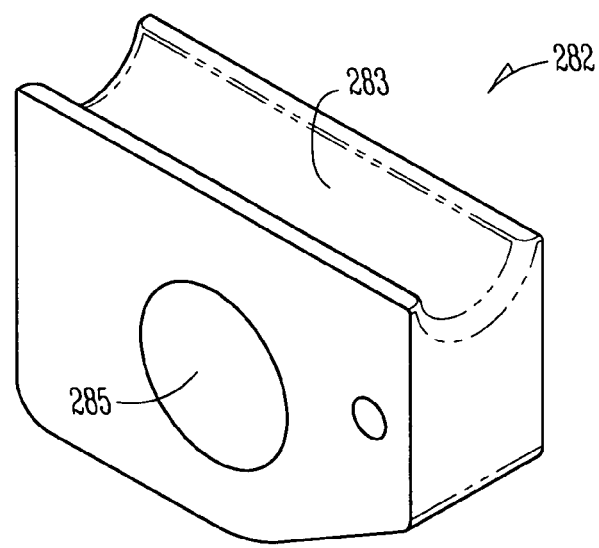
FIG. 2E shows other jaw components of a cable pulling device according to one embodiment of the invention.

FIG. 2E illustrates one example of a jaw 282 as shown in FIG. 2A as included in the second cable gripping device 280. A pivot feature 285 such as a circular hole is shown in the jaw 282. Similar to embodiments of jaws used in the first cable gripping device 270, in one embodiment, the jaw 282 includes a smooth cable contacting surface 283. Other embodiments include a textured cable contacting surface 261, such as ridges, or teeth.

Figure 3:
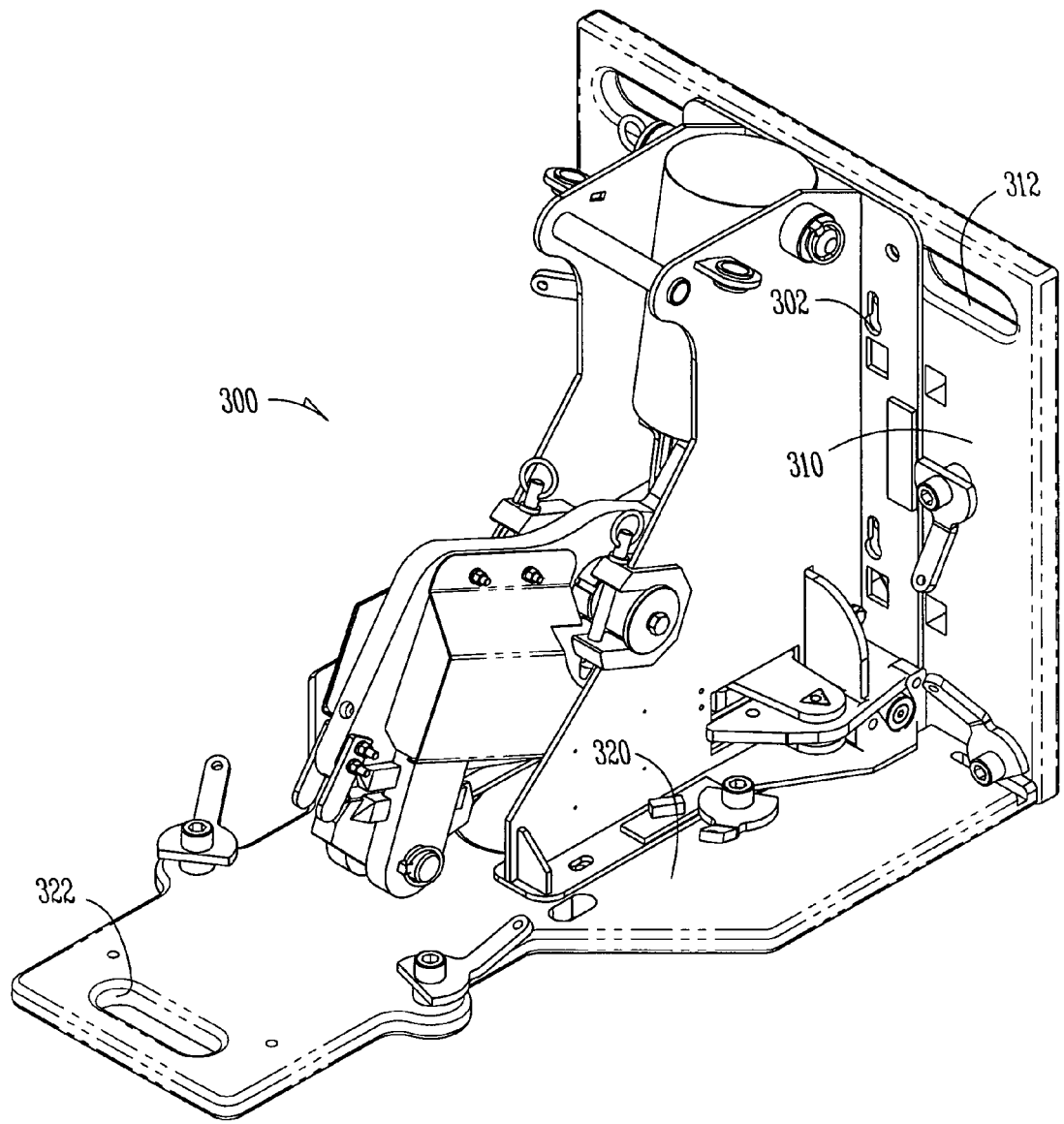
FIG. 3 shows a perspective view of a cable pulling device a according to one embodiment of the invention

FIG. 3 shows a cable pulling device 300. The cable pulling device 300 includes a first load spreading portion 310 and a second load spreading portion 320. In one embodiment, the first load spreading portion 310 and the second load spreading portion 320 include substantially flat plates. Materials such as aluminum, steel, other metals, composite materials, etc. are acceptable materials for formation of the first load spreading portion 310 and the second load spreading portion 320. In one embodiment, the first load spreading portion 310 and the second load spreading portion 320 are substantially orthogonal to each other. In one embodiment, the first load spreading portion 310 includes at least one handle 322. In one embodiment, the second load spreading portion 320 includes at least one handle 312. One function of handles includes operator convenience in carrying the respective load spreading portions. In one embodiment, the first load spreading portion 310 and the second load spreading portion 320 are separately detachable from the cable pulling device 300. Connecting features such as feature 302 are included in one embodiment to allow for easy coupling and uncoupling of the load spreading portions 310 and 320 from the cable pulling device 300. Examples of connecting features 302 include, but are not limited to bolts, dovetail joints, pins, slots, etc.

In operation, the first load spreading portion 310 and the second load spreading portion 320 of the cable pulling device 300 serve as force distributing surfaces. Each of the portions 310, 320 act on an earth surface in a different direction normal to a main surface of the respective plates. In one embodiment, the first load spreading portion 310 acts on a wall of a pit, the wall being substantially normal to a direction of cable pulling. In one embodiment, the second load spreading portion 320 acts on a bottom surface of a pit, the bottom surface being substantially parallel with the ground. The two force distributing directions provided by the first load spreading portion 310 and the second load spreading portion 320 provide a more stable pulling platform for the cable pulling device 300. In one embodiment, the first load spreading portion 310 and the second load spreading portion 320 together combine force distributing forces to resist a downward twisting force.

FIG. 4A shows a cable pulling device 400. The cable pulling device 400 includes a puller 401, and a force distributing device 410. In one embodiment, the puller is similar to embodiments described above. In one embodiment, the force distributing device 410 is easily detachable from the puller 401. Connecting features such as feature 402 and mating feature 412 are included in one embodiment to allow for easy coupling and uncoupling of the force distributing device 410 from the cable pulling device 400. Examples of connecting features 402 and mating features 412 include, but are not limited to bolts, dovetail joints, pins, slots, etc.

In one embodiment, the force distributing device 410 includes a first load spreading portion 414 and a second load spreading portion 416. In one embodiment, the first load spreading portion 414 and the second load spreading portion 416 include substantially flat plates. Materials such as aluminum, steel, other metals, composite materials, etc. are acceptable materials for formation of the first load spreading portion 414 and the second load spreading portion 416. In one embodiment, the first load spreading portion 310 and the second load spreading portion 320 are substantially orthogonal to each other. FIG. 4A further shows an opening 422 that allows for convenient loading of a cable (not shown) into the puller 401 without the need to disassemble any components of the cable pulling device 400.

The force distributing device 410 shown in FIG. 4 illustrates an embodiment where the first load spreading portion 414 and the second load spreading portion 416 are attached together to form an integral, one piece component. In one embodiment components of the force distributing device 410, including the first load spreading portion 310 and the second load spreading portion 320 are welded together.

The force distributing device 410 further includes a connection surface 418. In one embodiment, the connection surface 418 further includes at least one connection feature 420. In one embodiment, the connection feature 420 includes a number of threaded holes to accept bolts. Other connection features 420 include slots, pins, quick connect linkages, etc.

Figure 4B:
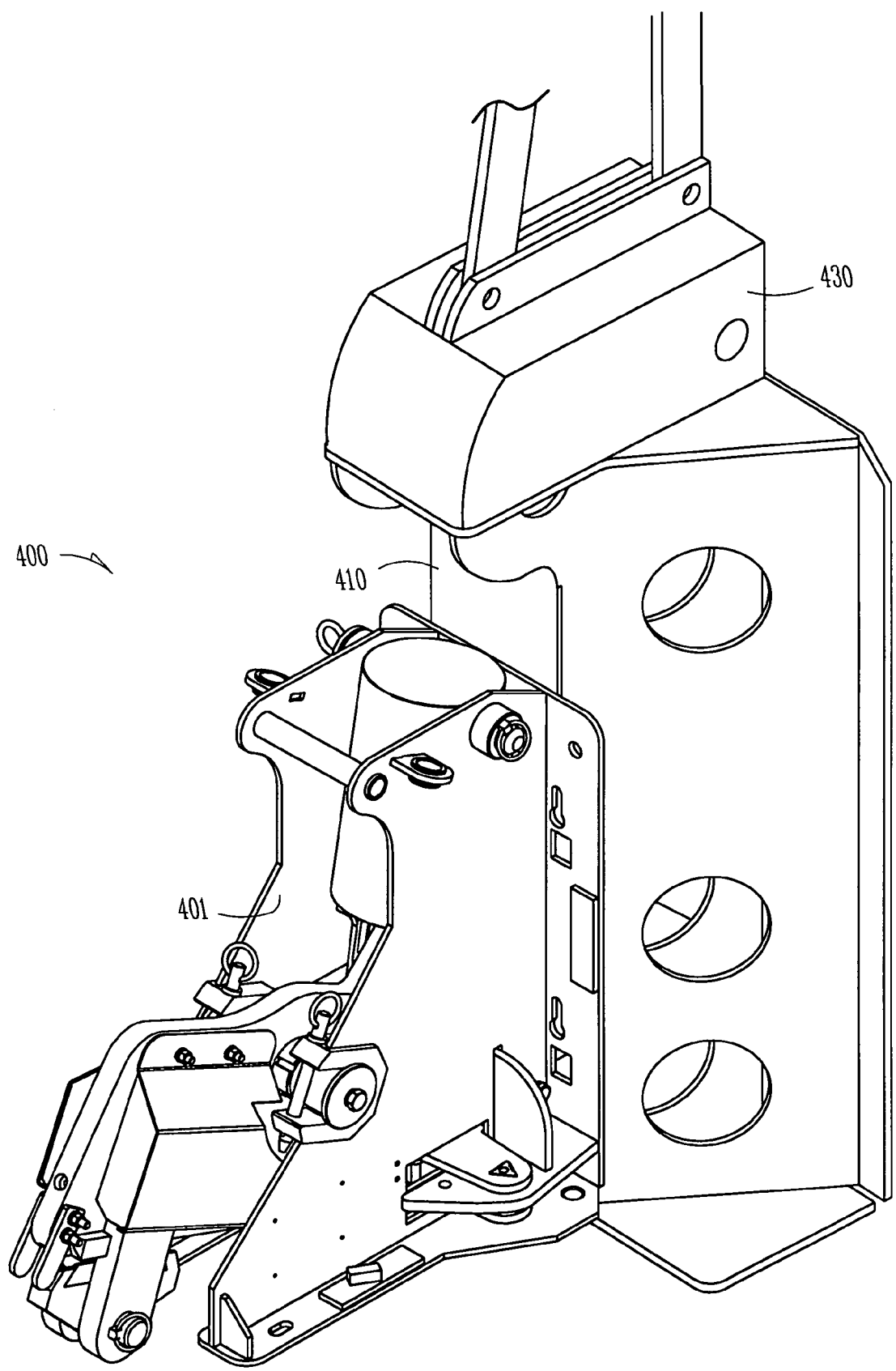
FIG. 4B shows a perspective view of a cable pulling device according to one embodiment of the invention.

FIG. 4B further illustrates the cable pulling device 400 coupled to an implement arm 430. FIG. 4B illustrates the implement arm 430 attached to the connection surface 418 of the force distributing device 410. Other embodiments include coupling of the implement arm 430 directly to the puller 401 of the cable pulling device 400. Ground working implements that may include an implement arm 430 include, but are not limited to, an excavator, back hoe, skid steer vehicle, etc. Attachment of the force distributing device 410 to an implement arm 430 makes location of the cable pulling device 400 in a location such as a pit easier and safer. Ground working implements also frequently have auxiliary hydraulic systems that may be used to power the cable pulling device 400.

Figure 5:
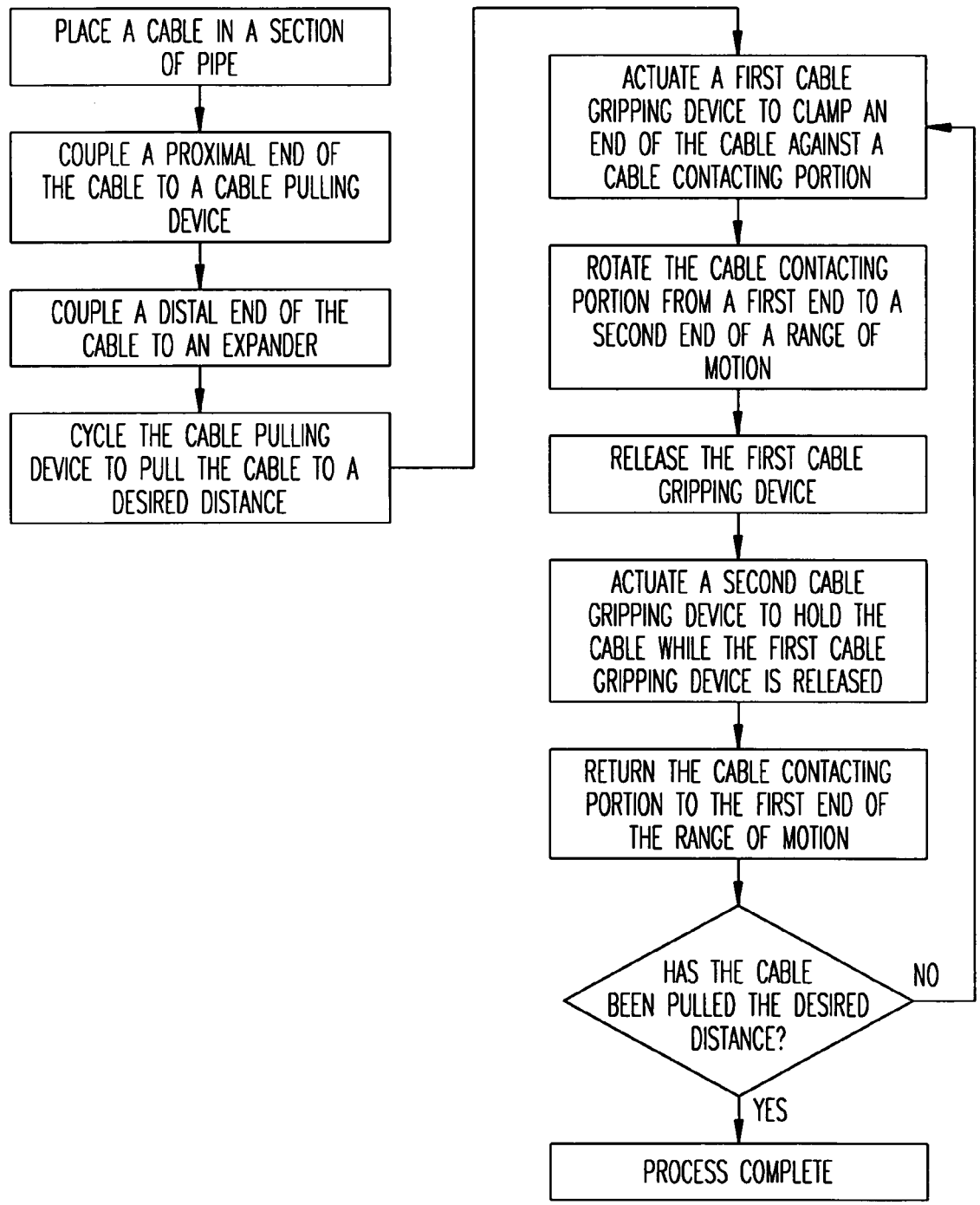
FIG. 5 shows a flow diagram of a method according to one embodiment of the invention.

FIG. 5 illustrates one method of operation of a cable pulling device according to embodiments described above. A cable pulling device is attached to a cable, that has been inserted through a pipe to be replaced. In one method, the cable is further attached to a bursting head, or expander, etc. that is to be pulled through the pipe to be replaced. The expander draws a new pipe into place as it is drawn through the old pipe. Among other options, the pipe to be replaced can be burst by the expander, or the bursting head can be used to draw a smaller diameter liner into the pipe to be replaced.

Using an embodiment of a cable pulling device as described above, the cable is placed into a first cable gripping device and a second cable gripping device. The cable pulling device is then cycled through a number of cycles until the cable is pulled to a desired distance. In one embodiment, a cycle includes first actuating the first cable gripping device to clamp an end of the cable against a cable contacting portion. The cable contacting portion is then rotated about a pivot joint from a first end to a second end of a range of motion. Rotation, in contrast to a linear pulling mechanism, allows the cable contacting portion to provide a supplemental frictional force that aids in cable gripping. As discussed above, the supplemental frictional force provided by the cable contacting portion both enhances the gripping force, and allows smooth jaws to be utilized, thus reducing cable damage.

At the second end of the range of motion, the first cable gripping device is released and the second cable gripping device is actuated. The second cable gripping device holds the cable in place while the cable contacting portion returns to the first end of the range of motion. Once the cable contacting portion returns to the first end of the range of motion, the cycle can be repeated as many times as necessary to pull the cable to the desired distance.

CONCLUSION

Thus has been shown a cable pulling device and methods where the cable pulling device is smaller, less expensive, and easy to use for lateral line replacement. The cable pulling device includes a cable contacting portion that provides supplemental frictional force during a rotational pulling stroke. Among other advantages, this allows a smaller, more compact design that provides higher gripping and pulling power. Embodiments as described above further allow for a smooth jaw configuration that reduces cable damage.

A cable pulling device has also been shown that includes a configuration of a force distributing device. One embodiment includes substantially orthogonal plates that help to reduce device twisting during a pulling operation. In a further embodiment, a force distributing device is adapted for attachment to a ground working implement arm. This configuration, is safer and easier to operate because it removes the need to lift the cable pulling device into an excavated pit, and it substantially keeps the operators out of the pit, where they are at an increased risk of injury.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used.

What is claimed is:

1. A cable pulling device, comprising:
    a base unit;
    a cable contacting portion movably coupled to the base unit in a range of motion;
    a first cable gripping device attached to the cable contacting portion to selectively engage and release a cable; and
    a cyclic actuating device to drive the cable contacting portion back and forth in the range of motion, wherein a cable is frictionally engaged with the cable contacting portion in a non-linear path within at least part of the range of motion.

2. The cable pulling device of claim 1, wherein the range of motion includes a portion of a circular rotating range of motion about a pivot joint.

3. The cable pulling device of claim 1, further including a second cable gripping device attached to the base unit, wherein the second cable gripping device is adapted to selectively engage and release a cable.

4. The cable pulling device of claim 1, further including a clamping actuation device coupled to the first cable gripping device, the clamping actuation device adapted to provide a gripping force when actuated.

5. The cable pulling device of claim 4, wherein the clamping actuation device includes a hydraulic cylinder.

6. The cable pulling device of claim 1, wherein the cyclic actuating device includes a hydraulic cylinder.

7. The cable pulling device of claim 1, further including a first load spreading portion and a second load spreading portion, wherein:
    the first load spreading portion and the second load spreading portion are mounted to the base unit substantially perpendicular to each other; and
    the first load spreading portion is adapted for placement against a side of a pit, and the second load spreading portion is adapted for placement against a bottom of the pit.

8. A method of pulling a cable through a section of pipe, comprising:
    placing a cable within a section of pipe;
    placing a portion of the cable outside the section of pipe along a friction engaging surface of a cable contacting portion;
    cycling the cable contacting portion through at least one cycle, including:
        actuating a first cable gripping device attached to the cable contacting portion, wherein a gripping force is applied to the cable in at least a portion of the friction engaging surface;
        moving the cable contacting portion from a first end of a non-linear range of motion to a second end of the non-linear range of motion to generate an axial pulling force in the cable and to generate an axial friction force separate from the gripping force;
        releasing the first cable gripping device at the second end of the non-linear range of motion to release the gripping force on the cable; and
        returning the cable contacting portion to the first end of the non-linear range of motion.

9. The method of claim 8, wherein moving the cable contacting portion from a first end of a non-linear range of motion to a second end of the non-linear range of motion includes moving the cable contacting portion in a portion of a circular range of motion about a pivot joint.

10. The method of claim 8, wherein cycling the cable contacting portion through at least one cycle further includes actuating a second cable gripping device attached to a base unit, wherein the second cable gripping device applies a gripping force to the cable when the first cable gripping device is in a released state.

11. The method of claim 8, further including attaching a pipe expander to a distal end of the cable, wherein the pipe expander bursts the section of pipe as it is pulled though the section of pipe.

12. The method of claim 8, further including attaching a pipe cutter to a distal end of the cable, wherein the pipe cutter splits the section of pipe as it is pulled though the section of pipe.

13. The method of claim 8, wherein placing the portion of the cable outside the section of pipe along the friction engaging surface of the cable contacting portion includes placing a portion of the cable along a cable contacting portion that is substantially tangent to a longitudinal axis of the pipe.

14. A cable pulling machine, comprising:
    a frame;
    a first cable gripping device to selectively engage and release a cable;
    a cyclic actuating device coupled between the frame and the first cable gripping device to drive the first cable gripping device back and forth in a range of motion;
    a second cable gripping device attached to the frame to selectively engage and release a cable;
    a first load spreading plate coupled to the frame to spread a portion of a pulling load against a side of a pit; and
    a second load spreading plate coupled to the frame substantially perpendicular to the first load spreading plate to spread a portion of the pulling load against a bottom of the pit.

15. The cable pulling machine of claim 14, further including quick release connectors to couple the first load spreading plate and the second load spreading plate to the frame.

16. The cable pulling machine of claim 14, wherein the cyclic actuating device drives the first cable gripping device back and forth in a non-linear range of motion.

17. The cable pulling machine of claim 14, wherein the cyclic actuating device drives the first cable gripping device back and forth in an arc motion about a single pivot point.

18. A cable pulling machine, comprising:
    a frame;
    a first cable gripping device to selectively engage and release a cable;
    a cyclic actuating device coupled between the frame and the first cable gripping device to drive the first cable gripping device back and forth in a range of motion;
    a second cable gripping device attached to the frame to selectively engage and release a cable;
    a force distributing device coupled to the frame, wherein the force distributing device includes a first surface larger than a surface of the frame to spread a portion of a pulling load against a side of a pit; and a connection surface located on the force distributing device to attach to an implement arm.

19. The cable pulling machine of claim 18, wherein the implement arm includes a backhoe implement arm.

20. The cable pulling machine of claim 18, wherein the force distributing device further includes a second surface substantially perpendicular to the first surface to spread a portion of the pulling load against a bottom of the pit.

21. The cable pulling machine of claim 18, wherein the cyclic actuating device drives the first cable gripping device back and forth in a non-linear range of motion.

22. The cable pulling machine of claim 18, wherein the cyclic actuating device drives the first cable gripping device back and forth in an arc motion about a single pivot point.

* * * * *